United States Patent
Häusler (10) Patent No.: US 9,384,617 B2
(45) Date of Patent: Jul. 5, 2016

(54) SENSOR AND APPARATUS FOR CHECKING PAPER GOODS, AND METHOD FOR SENSOR PREALIGNMENT

(75) Inventor: August Häusler, Wolfratshausen (DE)

(73) Assignee: GIESECKE & DEVRIENT GMBH, Munich (DE)

(*) Notice: Subject to any disclaimer, the term of this patent is extended or adjusted under 35 U.S.C. 154(b) by 1212 days.

(21) Appl. No.: 12/375,222

(22) PCT Filed: Jul. 24, 2007

(86) PCT No.: PCT/EP2007/006573
§ 371 (c)(1),
(2), (4) Date: Jan. 27, 2009

(87) PCT Pub. No.: WO2008/012068
PCT Pub. Date: Jan. 31, 2008

(65) Prior Publication Data
US 2010/0012730 A1    Jan. 21, 2010

(30) Foreign Application Priority Data

Jul. 27, 2006   (DE) .......................... 10 2006 034 783

(51) Int. Cl.
*G06K 13/00* (2006.01)
*G07D 11/00* (2006.01)

(52) U.S. Cl.
CPC ................... *G07D 11/0027* (2013.01)

(58) Field of Classification Search
USPC ........................................... 235/475; 702/22
See application file for complete search history.

(56) References Cited

U.S. PATENT DOCUMENTS

| 4,486,078 | A |   | 12/1984 | Hashimoto et al. |
| 4,583,398 | A |   | 4/1986  | Mitzel et al. |
| 6,022,019 | A | * | 2/2000  | Zimmermann .......... 271/258.01 |
| 6,588,118 | B2 | * | 7/2003 | Hellstrom .................. 33/501.02 |
| 7,146,279 | B2 | * | 12/2006 | Typpoe et al. .................. 702/22 |
| 2004/0251110 | A1 |   | 12/2004 | Jenrick et al. |

FOREIGN PATENT DOCUMENTS

| DE | 7035099 | 9/1970 |
| DE | 3242789 | 3/1984 |
| DE | 4103832 | 8/1992 |
| DE | 4227735 | 2/1994 |
| DE | 4402347 | 8/1995 |

(Continued)

OTHER PUBLICATIONS

International Search Report in PCT/EP2007/006573, Aug. 2, 2008.

(Continued)

*Primary Examiner* — Rafferty Kelly
(74) *Attorney, Agent, or Firm* — Workman Nydegger (57) ABSTRACT

In an apparatus for checking sheet material a plurality of sensors are arranged along a sensor path along which the sheet material, such as e.g. bank notes, is transported. The sensors each have two components which are arranged at opposite sides of the bank note transport path. For the functioning of many sensors it is necessary that the opposing sensor components are exactly aligned to each other. So as to achieve that the alignment of the sensor components arranged opposite each other is set with high accuracy and reproducible, the relative position of the sensor components opposing each other is defined by means of docking elements.

20 Claims, 4 Drawing Sheets

(56) References Cited

FOREIGN PATENT DOCUMENTS

| | | |
|---|---|---|
| DE | 19517294 | 11/1996 |
| DE | 101 35 005 A1 | 2/2003 |
| DE | 10329587 | 2/2005 |
| EP | 0631120 | 12/1994 |
| GB | 2090685 | 7/1982 |
| WO | 03/031904 | 4/2003 |

OTHER PUBLICATIONS

EPO Examination Communication for application EP07786299.3, Sep. 28, 2010.

* cited by examiner

SENSOR AND APPARATUS FOR CHECKING PAPER GOODS, AND METHOD FOR SENSOR PREALIGNMENT

FIELD OF THE INVENTION

The invention relates to a sensor for checking sheet material such as e.g. bank notes, in which opposing sensor components are exactly aligned to each other. In addition, the invention relates to an apparatus for checking sheet material in which such sensors are used, and a method for the preadjustment of such sensors.

BACKGROUND

From DE 32 42 789 C1 there is known an apparatus for checking sheet material having a plurality of sensors arranged along a sensor path along which the bank notes are transported. The sensors each have two components which are arranged at opposite sides of the bank note transport path. The components of various sensors which are arranged on one side of the transport path are jointly mounted on one mounting plate, one of the mounting plates being pivotally supported so that the sensor path can be exposed e.g. for maintenance purposes. For mounting, the two mounting plates, on which sensor components are located opposite each other, can be connected with each other for example via a hinge. Besides the mechanical play in the hinge, the mounting parts of the mounting plates and the two mounting plates, too, have tolerances. Because of the tolerances, normally, an exact alignment of the tipper sides of the mounting plates carrying the sensor components cannot be achieved. Even when tilting one of the mounting plates, for example for exposing the sensor path, out of the operating position and then back again, normally, they cannot be arranged in exactly the same position again. Instead, a slightly changed operating position of the mounting plate and thus the sensor components is the result. The relative position of components of a sensor located opposite each other and mounted on different mounting plates, therefore, is subject to a fluctuation which can lead to a maladjustment of the two components and impair the function of the sensor.

SUMMARY

Therefore, it is an object of the invention to achieve an improved accuracy and reproducibility of the alignment of opposing sensor components.

The solution to the problem is achieved by the use of docking elements which are used for the exact alignment of opposing sensor components. The alignment is effected such that the sensor components opposing each other form a functional sensor. In particular, the measuring elements arranged within the sensor components are aligned to each other such that a measuring signal emitted by one of the sensor components passes through the gap between the sensor components (and, if any, through the sheet material transported in the gap), and can be captured by an opposing sensor component. So as to exactly and reproducibly define the relative position of opposing sensor components, the sensor components are provided with docking elements which each consists of at least two partial elements. At each of the sensor components to be aligned at least one partial element is arranged which has associated thereto a different partial element as a counterpart at the opposing sensor component. By the corresponding partial elements of a plurality of docking elements touching each other an exact relative position of the sensor elements is defined, which is exactly reproducible even after mechanical influences from outside, e.g. shaking or temperature drift of mounting parts of the sensor components. The places at which the partial elements touch each other or at which they contact each other are predetermined by choosing certain surface forms of the partial elements. I.e., the position and the surface of the contact areas of the partial elements are controlled and are not achieved at random, as it would normally be the case because of the tolerances of arbitrarily chosen surfaces.

So as to fix the relative position of opposing sensor components and to hold steady the touching of the partial elements, a pressing force is applied which presses the opposing sensor components to be aligned against each other and holds such opposing sensor components in a relative position aligned to each other. The pressing force is applied to the housing of one or the two sensor components—preferably from the side facing away from the sheet material—for example in the direction parallel to a joint sensor axis. Alternatively the pressing force can be applied to a mounting plate on which one or a plurality of sensor components are arranged. The pressing force applied to a sensor component can be applied perpendicular as well as in a direction deviating from the perpendicular towards the front plane of the sensor component and/or towards a plane formed by the central points of the partial elements of a sensor component and/or towards the plane formed by the touching points of the docking elements. The direction of the applied pressing force crosses the respective plane preferably within an imaginary triangle which connects at least three of these partial elements. In the docked state the pressing force is applied to one of the sensor components for example such that the direction of the pressing force points into the triangle which connects the central points of the three partial elements of a sensor component. The direction of the pressing force can be chosen e.g. such that to each of the docking elements a certain minimum portion of the pressing force is applied, preferably to each of the docking elements is applied approximately the same portion of pressing force.

The partial elements of the docking elements can be mounted at the housings of the opposing sensor components in which the measuring elements of the sensor component are encapsulated. Alternatively, the partial elements can be mounted at one (or at a plurality of) retaining device(s) on which one or a plurality of sensor components are arranged, or they can be mounted at one or at a plurality of measuring elements of the sensor components. The partial elements of the docking elements can be detachable from the sensor component or from the retaining device or from the measuring element or can be permanently connected therewith. Alternatively, the partial elements can be integral parts of the housing of the respective sensor component or of the retaining device or of the measuring element, i.e. integrated in the housing of the sensor components or in the retaining device or in the measuring element. For example, at the surface of the housing of the sensor component or of the retaining device or of the measuring element there can be provided certain places at which contact is made with a corresponding partial element of the opposing sensor component, in particular to the corresponding places of the housing of the opposing sensor component or of the retaining device or of the measuring element. Such places can be e.g. provided depressions or elevations which match with corresponding partial elements of the opposing sensor component which act as counterparts.

Furthermore, the docking elements themselves are formed such that the relative position and the alignment of opposing sensor components can be held steady by the pressing force.

Here, the number of docking elements and their arrangement and mounting just the same as the material and the form of the partial elements touching each other play an important role.

Preferably, the docking elements are designed such that the relative position of the sensor components is not over-determined. In the case of an over-determination the relative position of opposing sensor components would be only inaccurately adjustable, because the unavoidable production tolerances of the mechanical parts at which an alignment is to be carried out in general allow a plurality of slightly different relative positions. Even with a high production accuracy such an inaccuracy—for example after a mechanical action from outside—already can lead to a maladjustment of the sensor. A measure for the exclusion of an over-determination is to use exactly three docking elements, which each have suitably formed partial elements. The partial elements provided for the mutual touch are each arranged at the corresponding positions at the opposing sensor components. The partial elements are formed at their surfaces provided for the mutual touch such that the relative position of the sensor components is not over-determined.

By choosing exactly three docking elements the relative position of the sensor components with respect to a translational motion perpendicular to the front plane of the sensor components is unambiguously defined. At their surfaces provided for touching, the partial elements in addition are provided for example with the following forms: One partial element of each of the three docking elements possesses a convex or outwardly bulged form, such as e.g. the form of a sphere. The three counterpart partial elements, however, have different forms so that they can fulfill the following functions: By the counterpart partial element of one of the docking elements only one of the three stops with respect to a translational motion perpendicular to the front plane of the sensor components is provided. The counterpart partial element of a further docking element is formed such that by the respective docking element is defined both the second stop and a pivotal point around which the sensor components can be rotated relative to each other in the front plane of the sensor components. The counterpart partial element of a further docking element provides the third stop and determines the relative orientation of the sensor components, namely with respect to the rotation in the front plane of the sensor components around the just mentioned pivotal point. In the docked state then neither a translational nor a rotational motion of the two sensor components relative to each other is possible. In this way the sensor components can be positioned to each other free of play.

So as to define the relative position of the sensor components as exact as possible, in addition, it is advantageous to arrange the three docking elements in the plane of the sensor fronts as far away from each other as possible. Preferably, the touch of two partial elements provided as counterparts is effected at touching surfaces as small as possible, so that the occurrence of abrasion and deposition of soil is avoided.

In view of the maintenance of the sensors it is advantageous that the sensor components are pre-adjusted already before their delivery in such a way that a sensor being in use at the customer does not have to be re-adjusted after the replacement of one of its sensor components. For such pre-adjustment, preferably, a first sensor component is firmly connected with an adjustment device. Then a second sensor component is brought into the position relative to the first sensor component predetermined by the docking elements and fixed there by means of the pressing force. For the exact alignment of the two sensor components then the measuring elements of the two sensor components are aligned to each other such that the sensor can work optimally. After the pre-adjustment has been carried out, the relative position of the opposing sensor components, which is predetermined by the docking elements, corresponds to a position of the measuring elements of opposing sensor components wherein these measuring elements are aligned to each other. Thus, the docking elements determine the aligned relative position of opposing sensor components. In this way the sensor components provided for an arrangement opposite each other can be pre-adjusted with respect to their relative position already before their delivery. A first sensor component, which is arranged on the adjustment device, can advantageously have aligned or pre-adjusted thereto a plurality of second sensor components. Additionally, there can be pre-adjusted further first sensor components, so that any pre-adjusted first and any pre-adjusted second sensor components can be combined to form a functional sensor without any further adjustment.

After the pre-adjustment the pre-adjusted sensor components, which together form a sensor, can be used in an apparatus for checking sheet material. Preferably, a plurality of pre-adjusted sensor components are prepared, which each are individually exchangeable. Advantageously, individual sensor components of a sensor can be exchanged and—without a re-adjustment being required—replaced by individual other pre-adjusted sensor components. By means of the pre-adjusted and across machines exchangeable sensor components, sensors or sensor components can be replaced with low effort, the operation of the apparatus having to be interrupted only a short time.

The sensor components of the sensors according to the invention can be parts of different kinds of sensors, e.g. mechanical sensors, magnetic sensors, capacitive sensors, photosensors in the UV, VIS or IR or of ultrasonic sensors.

The sheet material, for the checking of which the sensor according to the invention can be used, for example are bank notes, documents of value, tickets or the like. The apparatus for checking sheet material for example is a bank note processing machine.

BRIEF DESCRIPTION OF THE DRAWINGS

In the following the invention is described by way of example with reference to the accompanying figures.

DETAILED DESCRIPTION OF VARIOUS EMBODIMENTS

Figure 1A:
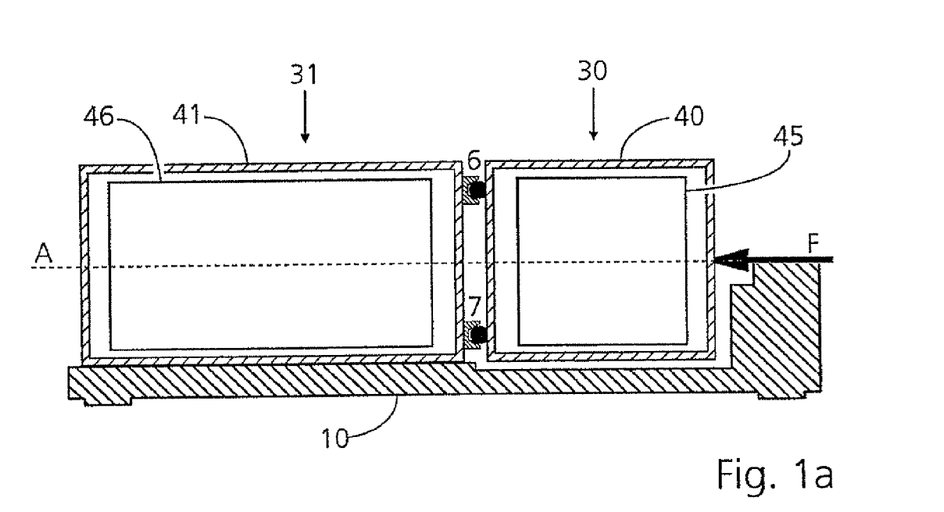
FIG. 1a shows a section through an adjustment device, on the top side of which by way of example two sensor components are arranged which are aligned to each other.
Figure 1B:
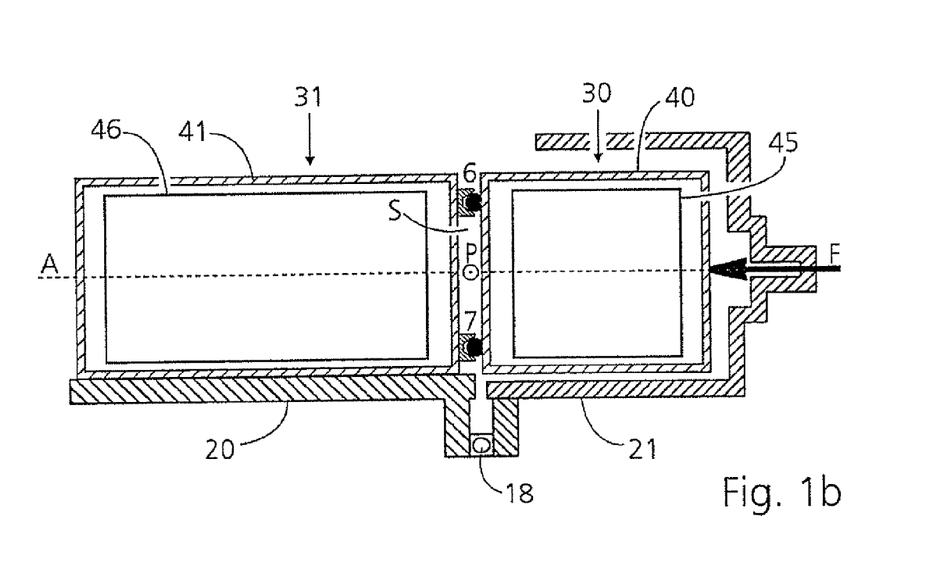
FIG. 1b shows a section through two mounting plates, on each top side of which by way of example one sensor component is arranged, which are aligned to each other by means of docking elements, FIG. 2a,b show a section (FIG. 2a) through two partial elements of a first docking element which touch each other and a front view (FIG. 2b) of the partial element having a flat surface, FIG. 3a,b show a section (FIG. 3a) through two partial elements of a second docking element which touch each other and a front view (FIG. 3b) of the hollow-prism-shaped partial element, FIG. 4a,b show a section (FIG. 4a) through two partial elements of a third docking element which touch each other and a front view (FIG. 4b) of the hollow-cone-shaped partial element.
Figure 2A:
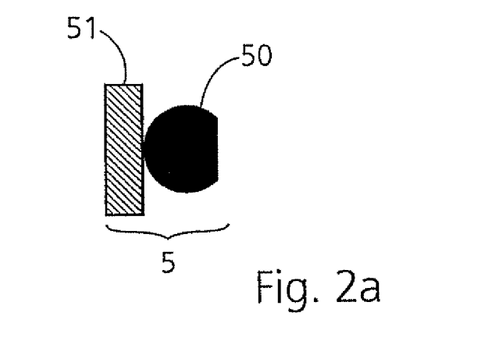
Figure 2B:
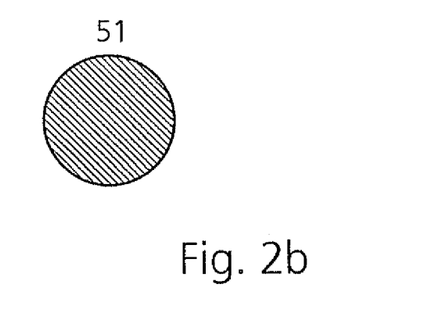
Figure 3A:
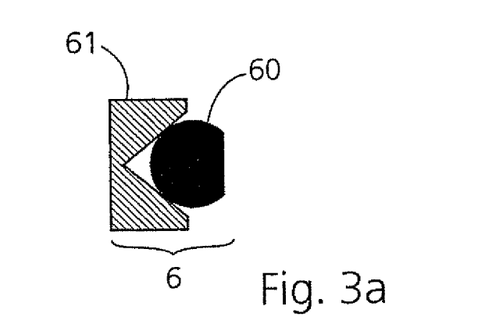
Figure 3B:
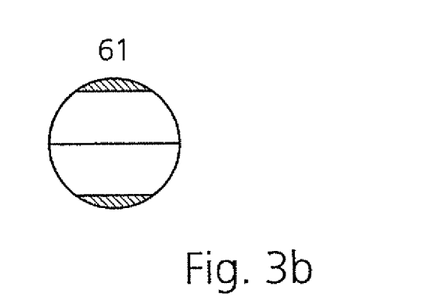
Figure 4A:
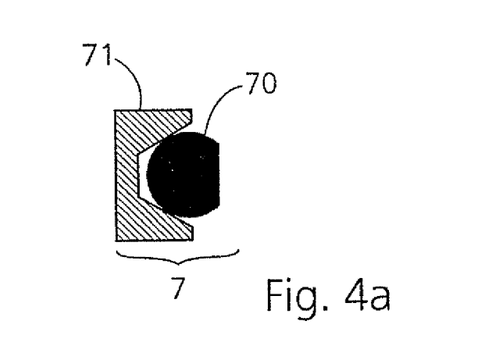
Figure 4B:
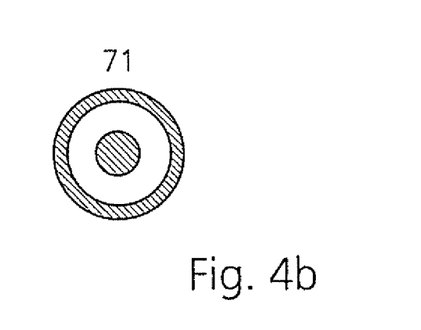

A sensor consists of for example two opposing sensor components 30, 31 between which a gap S is provided in which the transport of the sheet material (in the direction of P perpendicular out of the plane of projection) is effected, cf FIG. 1*b*. The two opposing sensor components 30, 31 each have a housing 40, 41 and measuring elements 45, 46 (in the FIGS. 1*a*, 1*b* only schematically shown) arranged in the respective housing. For defining the relative position of the sensor components 30, 31, at the sensor components 30, 31 are mounted a plurality of docking elements 5 (not shown), 6 and 7 which each consist of two partial elements. At the sensor component 30 one partial element per docking element is arranged which has associated thereto a different partial element at the opposing sensor component 31 as a counterpart. By the corresponding partial elements of a plurality of docking elements touching each other an exact relative position of the sensor components 30, 31 is defined. In the shown example the partial elements of the docking elements 5, 6, 7 are mounted at the housings 40, 41 of the opposing sensor components 30, 31.

A pressing force F, which presses the opposing sensor components 30, 31 to be aligned against each other and holds them in a position aligned to each other, is applied from the side facing away from the sheet material to the housing 40 of the sensor component 30—for example in the direction parallel to the joint sensor axis A—, cf FIGS. 1*a*, 1*b*.

So as to the opposing sensor components 30, 31 forming a functional sensor, the measuring elements 45, 46 of the sensor components 30, 31 are exactly aligned to each other on an adjustment device 10, of FIG. 1*a*. When it is an optical sensor, the measuring elements 45, 46 are for example light sources, photodetectors, dispersion elements, windows or lenses. The alignment to each other is effected in particular such that a measuring signal emitted by one of the sensor components can pass through the gap between the sensor components 30, 31 and, if any, through the transported sheet material and can be captured by the opposing sensor component. For the pre-adjustment of the sensor components preferably one sensor component 31 is firmly connected to the adjustment device 10 and the further sensor component 30 at first is pre-positioned by means of the adjustment device 10. Then the sensor component 30 is brought into the position predetermined by the docking elements 5, 6, 7 and fixed there by means of the pressing force F. After the alignment of the measuring elements 45, 46 has been carried out, the relative position of the opposing sensor components 30, 31, which is predetermined by the docking elements 5, 6, 7, corresponds to a position of the measuring elements 45, 46 of sensor components 30 31 aligned to each other. Thus, the docking elements 5, 6, 7 determine the aligned relative position of opposing sensor components 30, 31 which are pre-adjusted in this way.

FIG. 1*b* shows a detail of an apparatus for checking sheet material, such as e.g. a bank note processing machine, with two sensor components 30, 31 each of them being arranged on a mounting plate 20, 21. The mounting plates 20, 21 are connected with each other to be tiltable via a hinge 18. But the mounting plate 21 is used only for the pre-positioning of the sensor component 30. As with the adjustment device, then the sensor component 30 is brought into the position predetermined by the docking elements and fixed there by means of the pressing force F. Because of the pre-adjustment and the positioning at the docking elements 5, 6, 7 the result is an aligned-to-each-other relative position of the opposing sensor components 30, 31, which therefore form a functional sensor. The pre-adjusted sensor components are—without a new adjustment with respect to already mounted sensor components—exchangeable across machines.

So as to exclude the over-determination of the relative position of the sensor components, exactly three docking elements 5, 6, 7 are used each having two suitably formed partial elements. By the special formation of the surface of the partial elements the touching points or touching surfaces of the partial elements are predetermined. Thus, it can be ensured that the sensor components 30, 31—with an applied pressing force F—can carry out neither a translational nor a rotational motion relative to each other and their relative position is not over-determined. In the docked state the sensor components 30, 31 then ideally are positioned to each other absolutely free of play.

For example, one partial element of each of the three docking elements 5, 6, 7 has a convex or outwardly bulged form, while the three counterpart partial elements have different forms, cf FIGS. 2, 3, 4 and 6. A concrete solution for example can be found in the following realizations of the three docking elements 5, 6, 7:

a) The convex partial element 50 or 50' of the first docking element 5 at its surface has the form of a sphere. The respective partial element 51, 51' provided as a counterpart has a plane surface. The two first partial elements 50 and 51 and 50' and 51' touch each other—ideally—only at one point, in practice at an approximately point-shaped area (cf FIGS. 2*a,b*, 6*a,b*).

b) The convex partial element 60 or 60' of the second docking element 6, selectively, can be formed as a sphere or as a sphere which at its front side (facing the partial element 61 or 61') is flattened. The respective partial element 61, 61' provided as a counterpart has two areas at its surface which in relation to the front plane of the sensor component are inclined, cf FIGS. 3*a,b*, 6*a,b*. The two areas e.g. are sunk as a V-shaped groove into the partial element 61 and form—at least partial areas of—two sides of a triangle-shaped hollow prism, the top of which points in the direction of the sensor component, on which the partial element 61 is arranged. Instead of the partial element 61 there can also be used a partial element 61' which has the form of a triangle-shaped hollow prism with a cut off top, cf FIGS. 6*a,b*. The two second partial elements 60 and 61 and 60' and 61', respectively, touch each other—ideally—at two points, in practice at two approximately point-shaped areas. In the case of a flattened spherical partial element 60, 60' it is to be ensured that the two touching points lie in the spherical area of this.

c) The convex partial element 70 or 70' of the third docking element 7 likewise, selectively, can be formed as a sphere or as a sphere which at its front side (facing the partial element 71 or 71') is flattened. The respective partial element 71, 71' provided as a counterpart at its surface has the form of a hollow cone (cut off at the top), in particular a lateral surface of a hollow cone, cf FIGS. 4*a,b*, 6*a,b*. Alternatively, the partial element 71, 71' can have the form (of the lateral surface) of a not cut off hollow cone. The two third partial elements 70 and 70' or 71 and 71' touch each other—ideally—at a circle, in practice at an approximately circular area (cf FIGS.

Figure 6A:
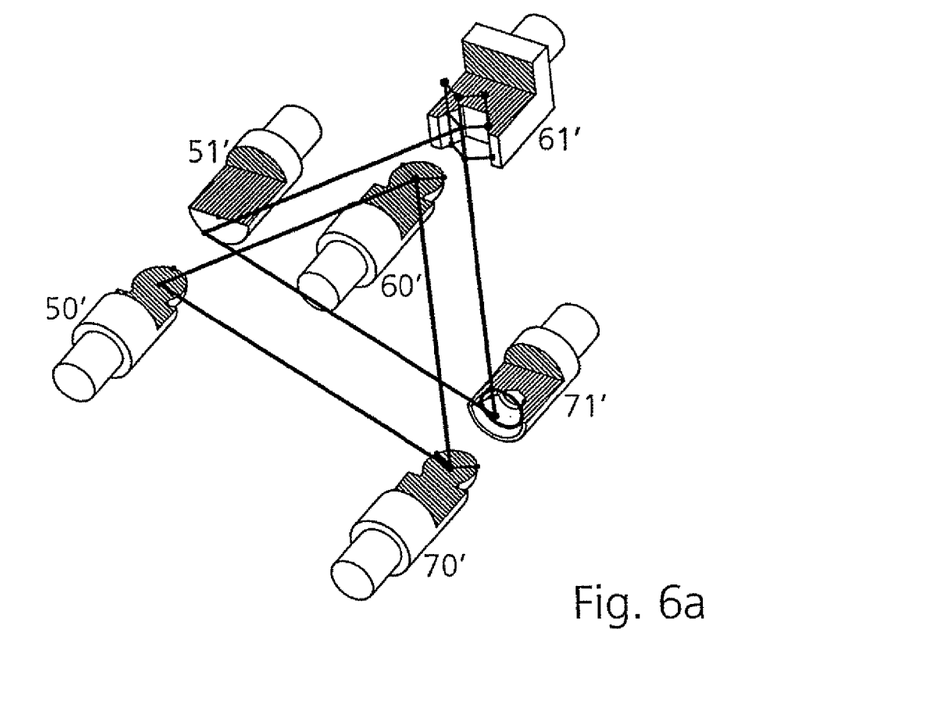
Figure 6B:
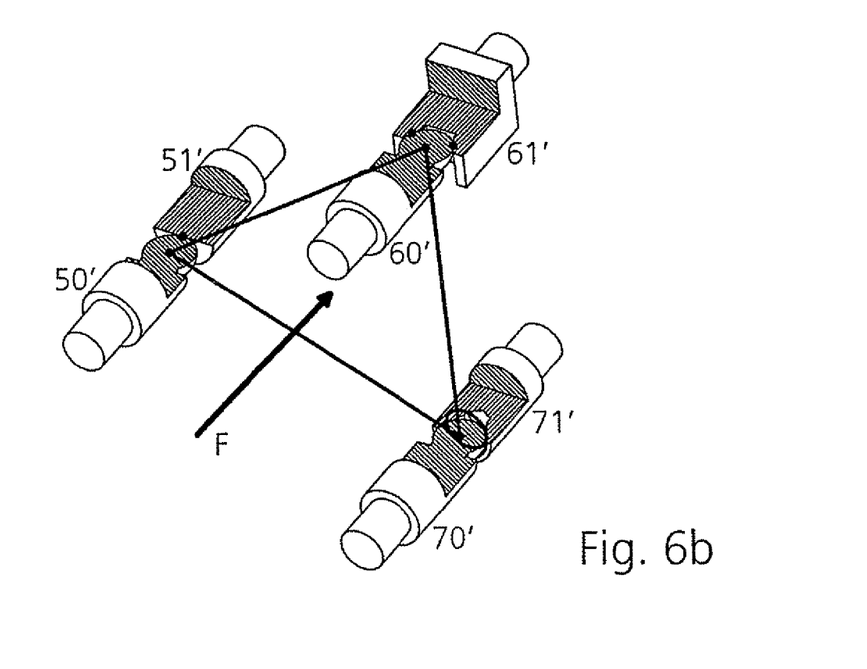

6a,b). In the case of a flattened spherical partial element 71, 71' it is to be ensured that the touching surface lies in the spherical area of this.

For illustrating the spatial arrangement, in FIG. 6 are displayed the three docking elements 5, 6, 7 having the partial elements 50', 51', 60', 61', 70', 71', before the docking (FIG. 6a) and in the docked state (FIG. 6b). In addition, in the FIGS. 6a,b are drawn triangles which result from connecting the central points of the partial elements 50', 60', 70' or the partial elements 51', 61', 71', and some auxiliary lines, and the touching points or touching lines of the respective partial elements which touch each other in the docked state. In the docked state the pressing force F for example is applied to the sensor component 30 having the partial elements 50', 60', 70' such that the direction of the pressing force F points into the triangle, which connects the central points of the partial elements 50', 60', 70'. The pressing force F can be applied both perpendicular to the plane of the triangle and obliquely thereto. An obliquely applied pressing force F can be required e.g. with a respective mounting position of the sensor components under the influence of the force of gravity.

Figure 5:
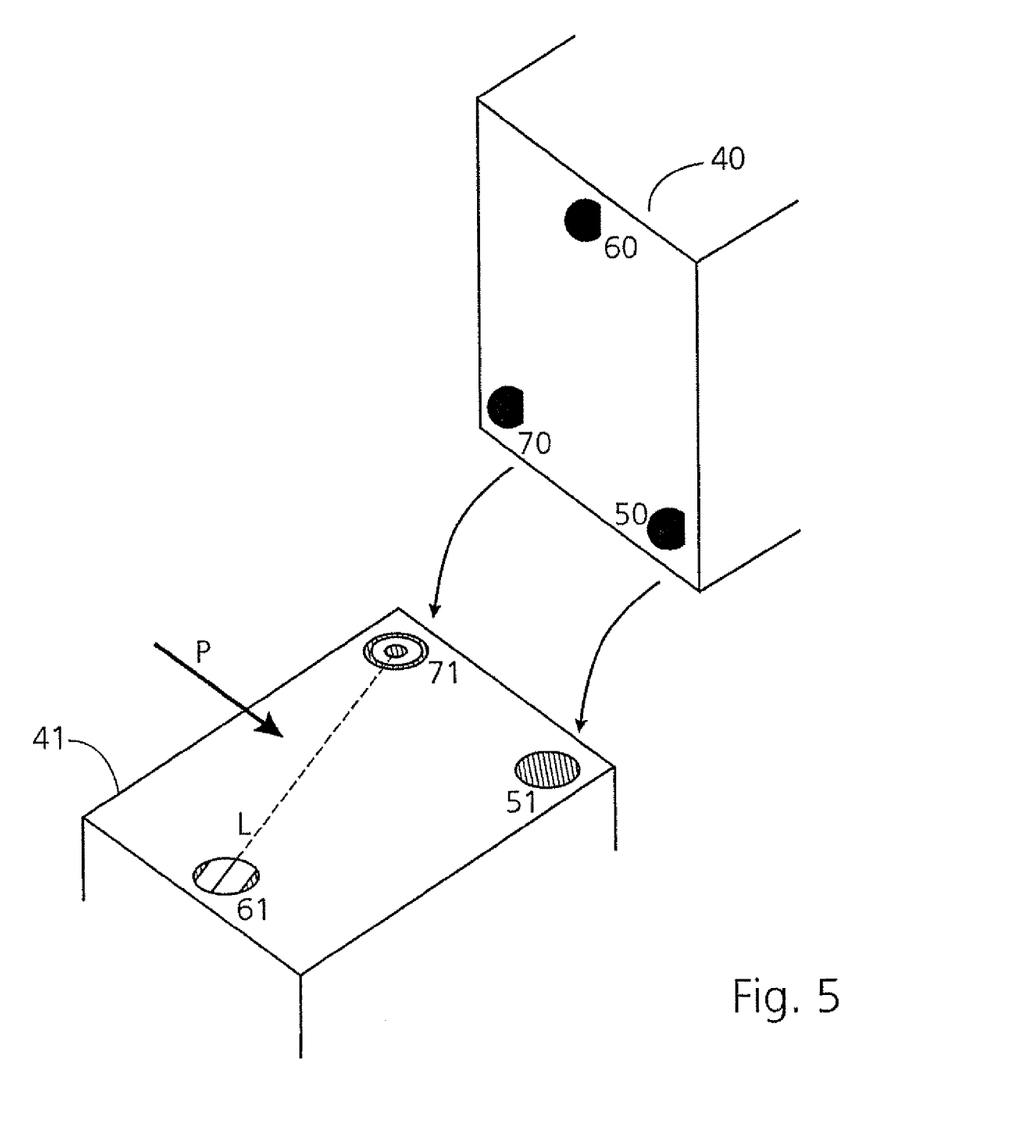
FIG. 5 shows a spatial view of two sensor components, from which one is tilted out of the operating position, with three docking elements arranged by way of example; the partial elements of the docking elements are only schematically shown, FIG. 6*a,b* shows a spatial view of three docking elements half cut open before the docking (FIG. 6*a*) and in the docked state (FIG. 6*b*).

The convex partial elements can be arranged as shown in FIG. 5, for example, on one sensor component and the counterpart partial elements on the opposing sensor component. The convex partial element and the respective counterpart partial element of each individual docking element 5, 6, 7, however, can also be interchanged, i.e. can be arranged on the respective other sensor component. I.e. on a sensor component can be arranged both convex partial elements and counterpart partial elements.

So as to define the relative position of the sensor components as exact as possible, the docking elements 5, 6, 7 should be arranged as far away from each other as possible within the front plane of the respective sensor component. Especially, the distance between the docking element 6 with the hollow-prism-shaped partial element 61, 61' and the docking element 7 with the hollow-cone-shaped partial element 71, 71' should be selected as great as possible to achieve a high angular accuracy of the arrangement, cf FIG. 5. Thus, a high accuracy with respect to a (minor) relative rotational motion of the sensor components in the front plane of the sensor components (around the hollow-cone-shaped partial element 71, 71' as a pivotal point) can be achieved. In addition, the orientation of the groove of the triangle-shaped hollow prism of the partial element 61, 61' should be chosen such that it points to the docking element 7 with the hollow-cone-shaped partial element 71, 71', cf the direction L in FIG. 5. In this way, the angular accuracy can be still further optimized.

It should be noted that the accuracy with which the partial elements of the docking elements 5, 6, 7 are to be arranged on the sensor components 30, 31 is relatively uncritical. Here it only has to be ensured that the respective partial elements provided for the mutual touch can come into contact with each other at the same time. For this a positioning accuracy is required which results from the lateral dimension of the partial elements 51, 51', 61, 61', 71, 71' (dimension measured in the front plane of the sensor components). For example it would be sufficient to apply the half lateral diameter of the partial elements as the accuracy for the relative distance of the partial elements.

The invention claimed is:

1. A sensor for checking sheet material, comprising at least two sensor components, wherein at least two of the sensor components are arranged on opposing sides of a transport path provided for a transport of sheet material, wherein a relative position of at least two opposing sensor components is defined by a plurality of different docking elements such that the opposing sensor components are aligned with each other, wherein at least one docking element of the plurality of different docking elements comprises a partial element arranged on one of the at least two opposing sensor components and a corresponding partial element arranged on another of the at least two opposing sensor components in such a way that the partial element of the one sensor component physically touches the corresponding partial element of the opposing sensor component to define the relative positions of the at least two opposing sensor components.

2. The sensor according to claim 1, wherein the sensor components opposing each other are held aligned with each other by an applied pressing force.

3. The sensor according to claim 2, including at least one device arranged to produce the pressing force.

4. The sensor according to claim 2, wherein at least one of the docking elements has at least two partial elements which touch each other only at predetermined places, and at least two of the partial elements touching each other are held in contact with each other by the pressing force.

5. The sensor according to claim 1, wherein the relative position of at least two of the sensor components opposing each other is defined by said at least one docking element such that at least one measuring signal emitted by one of the sensor components is capturable by at least one opposing sensor component aligned therewith.

6. The sensor according to claim 1, wherein the alignment of at least two of the sensor components opposing each other with each other is effected such that they form a functional sensor.

7. The sensor according to claim 1, wherein said at least one docking element is arranged at the sides facing each other of at least two of the sensor components opposing each other.

8. The sensor according to claim 1, wherein the docking elements are formed such that the relative position of at least two of the sensor components opposing each other is not over-determined and/or is exactly reproducible.

9. The sensor according to claim 1, wherein at least a first of the partial elements touching each other has an outwardly bulged surface at the side arranged to touch a second of the partial elements touching each other.

10. The sensor according to claim 1, wherein the relative position of two sensor components opposing each other is defined by three docking elements.

11. The sensor according to claim 10, wherein each of the three docking elements has a first partial element which at its front side, which is arranged to touch a front side of a second partial element of the respective docking element, and has an outwardly bulged surface.

12. The sensor according to claim 11, wherein the second partial element of a first of the three docking elements at its front side has a plane surface and the second partial element of a second of the three docking elements at its front side has the form of the lateral surface of a hollow cone or of a cut off hollow cone and the second partial element of a third of the three docking elements at its front side has the form of a hollow prism or of a cut off hollow prism.

13. An apparatus for checking sheet material having at least one sensor according to claim 1.

14. A method for pre-adjusting one or a plurality of sensor components of a sensor according to claim 1, comprising the following steps:

arranging a first sensor component on an adjustment device, positioning a second sensor component adjacent the first sensor component with the relative positions of the two sensor components being predetermined by one or a plurality of docking elements, aligning one or a plurality of measuring elements of the second sensor component to one or a plurality of measuring elements of the first sensor component so that the second sensor component is pre-adjusted.

15. The method for the pre-adjustment according to claim 14, wherein a plurality of second sensor components are pre-adjusted to the first sensor component.

16. The method for the pre-adjustment according to claim 15, wherein the first sensor component is combinable with any pre-adjusted second sensor component without any further adjustment to form a functional sensor.

17. The method for the pre-adjustment according to claim 14, wherein, in addition to the pre-adjustment of the one or the plurality of second sensor components, further first sensor components are pre-adjusted.

18. The method for the pre-adjustment according to claim 17 comprising the following steps:

arranging a second sensor component on the or on a further adjustment device, positioning a first sensor component at the second sensor component with the relative positions of the two sensor components being predetermined by one or a plurality of docking elements, aligning one or a plurality of measuring elements of the first sensor component to one or a plurality of measuring elements of the second sensor component, so that the first sensor component is pre-adjusted.

19. The method for the pre-adjustment according to claim 17, wherein the one pre-adjusted second or the plurality of pre-adjusted second sensor components is combinable with any pre-adjusted first sensor component without further adjustment to form a functional sensor.

20. The method for the pre-adjustment according to claim 14, wherein the pre-adjustment of the one or the plurality of first and/or the one or the plurality of second sensor components is carried out before these are delivered and/or before these are mounted on an apparatus for checking sheet material.

* * * * *